(12) United States Patent
Daumerie et al.

(10) Patent No.: US 6,962,960 B1
(45) Date of Patent: Nov. 8, 2005

(54) METHOD FOR REMOVING VOLATILES FROM A BLOCK COPOLYMER

(75) Inventors: Michel Daumerie, Houston, TX (US); Douglas A. Berti, Nassau Bay, TX (US); Jose Sosa, Deer Park, TX (US); Aron T. Griffith, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 540 days.

(21) Appl. No.: 10/044,759

(22) Filed: Jan. 9, 2002

(51) Int. Cl.[7] ............................................. C08F 2/06
(52) U.S. Cl. ........................ 526/73; 526/335; 526/337; 526/346; 526/347
(58) Field of Search .................... 526/73, 335, 337, 526/346, 347

(56) References Cited

U.S. PATENT DOCUMENTS

| | | | |
|---|---|---|---|
| 4,939,208 A | 7/1990 | Lanza et al. | 525/93 |
| 5,264,489 A | 11/1993 | Lanza et al. | 525/101 |
| 5,540,813 A | 7/1996 | Sosa et al. | 159/47.1 |
| 6,143,833 A * | 11/2000 | Klussmann et al. | 525/316 |

FOREIGN PATENT DOCUMENTS

WO  0064554  11/2000

OTHER PUBLICATIONS

"Falling-Strand Devolatilization," Robert H.M. Simon, Polymer Devolatilization, edited by Ramon J. Abalalak, Marcel Dekker, Inc., NY, NY 1996.
Polymer Devolatilization, pp. 1-12, edited by Ramon J. Albalak, Marcel Dekker, Inc., NY, NY 1996.

* cited by examiner

Primary Examiner—William K. Cheung
(74) Attorney, Agent, or Firm—Tenley R. Krueger

(57) ABSTRACT

A method and apparatus are disclosed for purifying copolymer compounds having monovinyl aromatic blocks and conjugated diene blocks by reducing the residual monomer content of the finished polymer. The method and apparatus includes a combination of heat exchangers and devolatilizers used in conjunction with a copolymerization reactor system.

19 Claims, 1 Drawing Sheet

METHOD FOR REMOVING VOLATILES FROM A BLOCK COPOLYMER

TECHNICAL FIELD OF THE INVENTION

The present invention is directed, in general, to polymer manufacturing processes and, more specifically, to a method for the removal of volatiles from a block copolymer having monovinyl aromatic and conjugated diene blocks.

BACKGROUND OF THE INVENTION

In the preparation of polymeric materials, particularly mass processable copolymers, considerable amounts of unreacted monomers and low molecular weight polymers remain entrained in the copolymer product after the polymerization process. Additionally, it is common practice to employ various inert solvents and other volatile agents in the polymerization reaction mixture in order to achieve desirable operating conditions and characteristics of the polymer product. However, the presence of these low molecular weight contaminants in the final polymer product may have adverse effects on the polymer properties. Additionally, these volatile components are subject to leaching, thereby deterring use of the polymer product in food packaging applications. Accordingly, removal of these undesirable volatile components is highly desirable.

In order to produce the highest quality product, it is desirable to reduce the residual concentration of volatiles in the finished polymer as much as possible. For many commercial applications, including food and beverage packaging, federal regulations impose exacting standards on acceptable levels of volatiles in polymers comprising the package material. Thus, much effort has been expended in designing and developing devolatilization apparatus and procedures for reducing volatiles in the products of polymerization processes. An overview of devolatilization technology, is provided by Ramon Albalak, Polymer Devolatilization, (Marcel Dekker, Inc. New York, 1996), incorporated herein by reference.

One method of reducing volatiles in polymers is extrusion. In an extrusion method, the polymer is heated and pushed through an extrusion die. The extrusion process increases the surface area of the polymer allowing the heated volatile components to escape. Extrusion devolatilization may be coupled with steam stripping to remove additional volatiles. Problems associated with extrusion devolatilization include introducing the polymer to additional thermal and shear stresses. Such stresses contribute to the undesirable formation of gels and colored bodies. In addition, extrusion methods require intensive capital investment in large-scale extruders. Steam stripping can also add undesirable heat history to the polymer product stream.

Another problem with extrusion is that this technique may not sufficiently reduce volatile content, especially when the process stream contains only 15–30% polymer and the remainder being monomer and solvent. In order to remove volatile components such that the percentage of polymer is 90%–100% without adding significant heat history, the throughput from extrusion devolatilization may be unacceptably low.

Thus, what is needed in the art is a method for devolatilizing a polymer that is less capital intensive yet suitable for removing of volatiles from a polymer stream and does not introduce undesirable thermal and shear stresses.

SUMMARY OF THE INVENTION

To address the above-discussed deficiencies of the prior art, the present invention provides a method of manufacturing a polymer comprising 1) passing a block copolymerization product through a first devolatilizer operated at a first low pressure to form a once devolatilized copolymer; and 2) passing the once devolatilized block copolymer product from the first devolatilizer to a conduit.

In another aspect, the present invention provides a method of manufacturing a block copolymer comprising, 1) passing a block copolymerization product through a first devolatilizer operated at a first low temperature to form a once devolatilized block copolymer product; and 2) passing the once devolatilized block copolymer product from the first devolatilizer to a second devolatilizer operated at a second low temperature to form a twice devolatilized block copolymer product.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
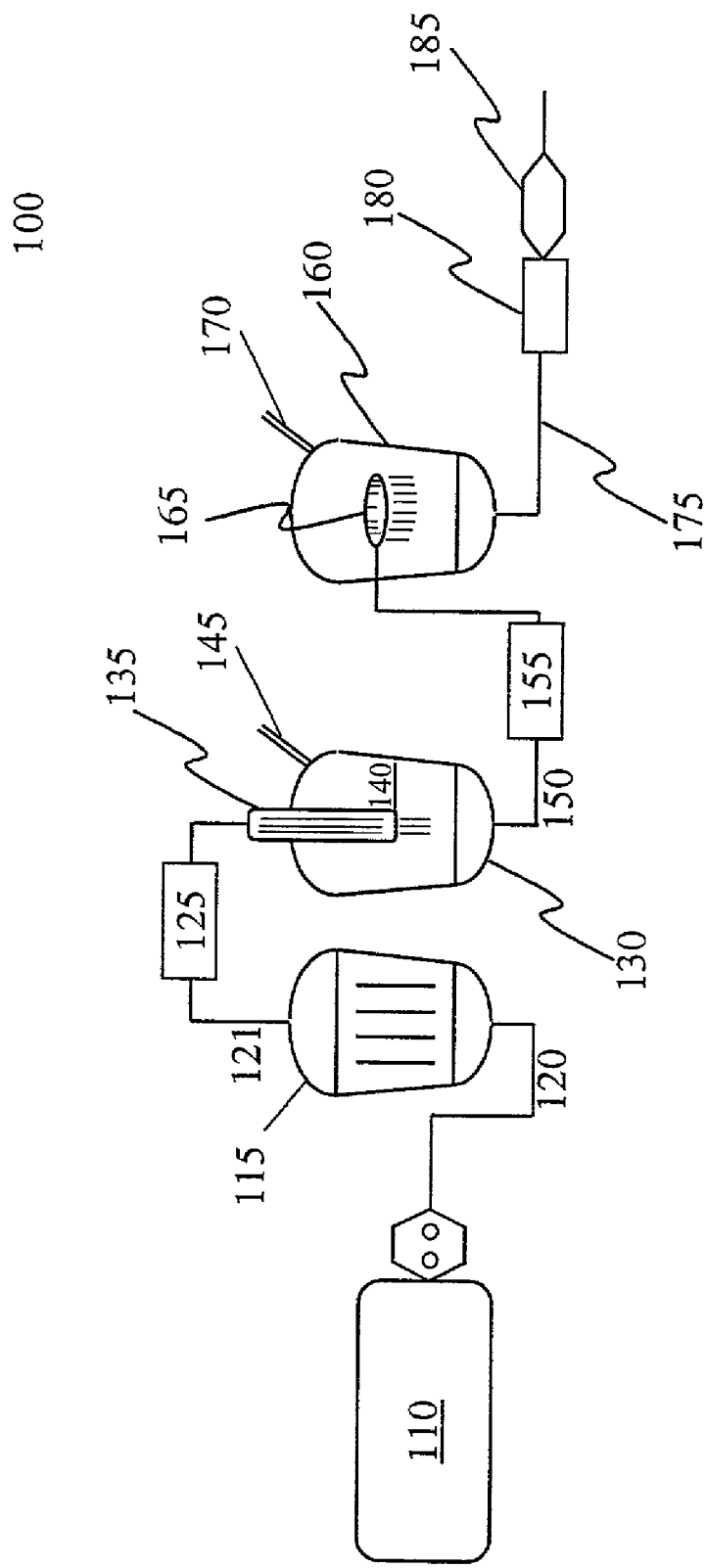
FIG. 1 illustrates a schematic representation of one embodiment of a copolymer devolatilization system according to the present invention.

Although the concentration of a product from a diolefin monomer and a random copolymer by flash evaporation, is known, the complete devolatilization to produce pellets is not. Similarly, although conventional methods to devolatilize copolymers to yield low levels of residuals is known, such methods have not been developed for thermoplastic elastomers. Moreover, current processes may leave undesirably high concentrations of volatiles in the polymer product. The method described in further detail below may be envisioned as enhanced multi-stage devolatilization, whereby, surface area is generated by bubble formation in the first stage, and surface area is generated by nozzles with small holes when migration of volatiles is limited by diffusion. Thus, in early stages of flash devolatilization bubble formation or foaming is maximized. The process, thus described, allows for the optimization of parameters, such as, temperature, pressure and residence time needed to remove volatile components without compromising the properties of the copolymers.

Referring initially to FIG. 1, there is illustrated a representative embodiment of the polymer devolatilization system 100 similar to that disclosed in U.S. Pat. No. 5,540,813 to Sosa et al. and in U.S. Pat. No. 6,143,833 to Klussmann et al., both of which are incorporated herein by reference. The devolatilization system 100 of the present invention includes one or more reactor systems 110 for manufacturing polymers. One such polymer may be a block copolymerization product formed in the reactor system 110 by the methods disclosed in U.S. Pat. Nos. 4,939,208 and 5,264,489 to Lanza, et al., which are incorporated herein by reference. As disclosed in Lanza et al., a block copolymer may be comprised of a monovinyl aromatic homopolymer block, a conjugated diene block, a random conjugated diene-monovinylic aromatic rubber block, and a monovinyl-substituted aromatic homopolymer block.

Certain embodiments of the reactor system 110 used in the present invention may additionally include a heat exchanger 115 that serves as an additional polymer reactor. Reactor system 110 and heat exchanger 115 are connected by delivery conduit 120. Heat exchanger 115 may be of any configuration including up-flow and down-flow types. The polymer stream exits the heat exchanger 115 via delivery conduit 121. In some embodiments, the polymer may be passed by an advancing mechanism 125, such as a pump, to a first devolatilizer 130. In other embodiments, advancing mechanism 125 may not be necessary. The first devolatilizer 130 may be operated at a low pressure from less than about 20 Torr to about 200 Torr.

In those embodiments including the first devolatilizer 130, the first devolatilizer 130 may include a heat exchanger 135 that may be a devolatilization preheater that consists of a shell and tube heat exchange structure. The heat exchanger 135 may be operated to heat the polymer stream to facilitate the devolatilization of the block copolymer product stream as it enters the devolatilization tank 140. Alternatively, as disclosed in Klussman et al., the first devolatilzer 130 may be jacketed to permit heating via the circulation of hot water. The first devolatilizer 130 may be operated at any temperature suitable for removing volatiles. However, a low temperature is expected to contribute to avoiding the undesirable formation of cross-links in some copolymers, and the formation of gels and colored bodies in the block copolymerization product. Temperatures are selected depending on the solvent type and the viscosity of the solution. For example, the temperature of the first devolatilizer 130 may range from about 130° F. to about 450° F., for a combination of viscosity, pressure and residence time. In a particular embodiment, after exiting the reactor system 110 at about 150° F., the copolymer stream may enter the first devolatilizer 130, which is maintained at about 145° F. The polymer may collect in the lower region of the devolatilization tank 140. As disclosed in Sosa et al., in particular embodiments, the shell and tube heat exchanger 135 will have a diameter and length to ensure the desired and thorough heating of the copolymer stream. Additionally, the passage rate of the polymer through the devolatilization system 100, and the operating temperature and pressure of the first devolatilizer 130 are preferably selected to maximize foam formation to increase surface area by bubble formation. The first devolatilizer 130 may also preferably include at least one vapor removal line 145 for removing and collecting the volatile components of the copolymer product stream.

A conduit 150 facilitates the exit of a once devolatilized block copolymer product from the lower end of the first devolatilizer 130. At this stage in the manufacturing process, the once devolatilized copolymer may be considered partially devolatilized or fully devolatilized, depending on the subsequent intended uses for the copolymer. Thus, in certain embodiments, the conduit 150 is coupled to an advancing mechanism 155 that transmits the partially devolatilized copolymer stream to a second devolatilizer 160. Preferably, the second devolatilizer 160 may include a distribution nozzle 165 located therein that increases the surface area of the copolymer product stream to aid in removal of the volatiles. Devolatilized vapors are removed from the second devolatilization tank 160 through a vapor removal line 170. As disclosed in Kussmann et al., volatiles removed through vapor removal line 170 may be passed to a condenser and reduced to their liquid stage whereupon they may be recycled back into the polymerization process.

As disclosed in Sosa et al., distribution nozzle 165 may be configured to increase the surface area of the copolymer product stream. However, excessively high shear rates will contribute to forming shear stresses and the resultant above-mentioned undesirable properties in some copolymers. In one embodiment, the distribution nozzle 165 may comprise a hoop nozzle manifold located in the upper portion thereof. In another embodiment, the distribution nozzle may be a straight pipe. The distribution nozzle 165 may also be configured to have a plurality of small orifices to allow the polymer stream to enter the second devolatilzer 160 such that a large surface area of the polymer is thereby exposed. The diameter of the orifices located in distribution nozzle 165 may be less than about $5/32$ inch, preferably less than about $5/64$ inch, and most preferably in the range of about $3/64$ inches or smaller in flow diameter. Similarly configured distribution nozzles may be included in the first devolatilizer 130.

The temperature of the second devolatilizer 160 may be maintained using any of the means used for the above-described embodiments of the first devolatilizer 130. For the same reasons described above, the second devolatilizer 160 may be operated at any temperature suitable for removing volatiles, although excessively high temperatures are preferably avoided. The preferred operating temperature range of the second devolatilizer 160, for example may range from about 300° F. to about 480° F., depending on residence time and pressure. In addition, higher temperatures are favored when dealing with high viscosity polymers to maintain polymer fluid flow. Moreover, considerations such as the tendency for polymer cross-linking and solvent type will effect the choice of temperature range. Alternatively, in instances where these considerations do not apply, lower temperature may be preferred. In one embodiment, the first devolatilizer 130 is operated at a lower processing temperature than the second devolatilizer. For example, in a particular embodiment, after exiting the first devolatilizer 130 which is operated at about 145° F., the once devolatilized copolymer stream may enter the second devolatilizer 160, which is operated at about 300° F. In one embodiment, the second devolatilizer 160 may be operated at lower pressure than the first devolatilizer 130. For example, in a particular embodiment, the second devolatilizer 160 may be maintained at a low pressure of from less than about 1 Torr to about 20 Torr, while the first devolatilizer 130 is operated at a pressure of from about 20 Torr to about 200 Torr.

A delivery conduit 175 exits the lower end of the second devolatilization tank 160 and connects to an advancing means 180 to transmit the devolatilized polymer material to a finishing operation 185, such as a pelletizer. In one embodiment, finishing operation 185 may include passing the polymer product through an extruder prior to passage through a pelletizer. The extruder may preferably be a twin screw extruder; other extruders known to those skilled in the art may be used.

In one manufacturing operation, a block copolymerization product enters the devolatilization system from the reactor system 110, through delivery conduit 120 into the first heat exchanger 115. From there the block copolymer may pass through delivery conduit 121 through pump 125 into a second heat exchanger denoted as the devolatilizer preheater 135, which may be a shell-and-tube heat exchanger. Heated polymer then passes through the heat exchanger 135 to a first devolatilizer 130 operating at a first low temperature, for example about 145° F., allowing volatiles to flash off as they exit the heat exchanger 135. The vaporized volatiles are removed through vapor line 145. The once devolatilized copolymer product stream is then passed through conduit 150 and advanced by pump 155 before being injected through a distribution nozzle 165 to a second devolatilizer 160. This allows additional devolatilization of the polymer as volatiles are removed from vapor removal line 170 by vacuum means known to those skilled in the art. The copolymer passing through the aperture of the distribution nozzle 165 to the second devolatilizer 160 operating at a second low temperature, for example about 180° F., is collected at the bottom end of tank 140 and exits through delivery conduit 175 and pump 180. The twice devolatilized copolymer may then be cooled, pelletized at finishing operation 185 and readied for shipment to the consumer.

EXPERIMENTS

Experiments simulating the devolatization process were performed in a vacuum oven using test solutions (A thru I) of Finaclear™ (FC530), an SBS containing 75% styrene and 25% butadiene. Solutions containing 25% Finaclear™ in cyclohexane were devolatilized as shown in Table 1. All experiments involved heating the oven to about 490° F. under a nitrogen atmosphere, rapidly transferring an aluminum pan containing 20 grams of solution into the oven and evacuating the oven with a vacuum pump. All test solutions started foaming within 2 minutes, and a pressure of 5 Torr was reached after 5 minutes. The concentration of cyclohexane (ppm) were measured by a gas chromatography with a detection limit of 10–20 ppm.

Macrogel (micro) was determined using the conventional Monsanto Gel procedure. Microgel (macro) was determined by standard swell index by centrifugation of solutions. Swell index provides a measure crosslinking occuring in elastomers when exposed to heat. Swell index is measured by determining the presence of microgel (0.1–30 microns), as calculated from the ratio of wet gel in toluene/dried gel. Measured amounts of sample were dissolved in toluene and the gel separated by centrifugation at about 18,000 rpm for 1 hour. Swell indices as high as 40 may be measured by this technique. A swell index of 4–5 indicates complete crosslinking. The Monsanto Gel Test to determine the presence of macrogel (0.05 to 3 mm), involved preparing 5% solutions in toluene, filtering them through fine filter paper. A blue dye is used to stain the rubber gels. The number and size of gels can be measured by visual inspection. As illustrated in TABLE 1, materials with low gel crosslinking, good color and low residual volatile concentrations can be obtained from the devolatization process of the present invention.

TABLE 1

Devolatilization of FC 530/cyclohexane solutions

| Time (minutes) | Temp (° F.) | Vacuum (Torr) | Cyclohexane (ppm) | Gel macro | Gel micro |
|---|---|---|---|---|---|
| A 10 | 439 | 1.9 | n.d. | 0 | n.d. |
| B 15 | 439 | 1.3 | n.d. | 0 | n.d. |
| C 20 | 397 | 1.2 | n.d. | 0 | n.d. |
| D 10 | 397 | 5.0 | 320 | 0 | n.d. |
| E 15 | 403 | 1.5 | n.a. | 0 | n.d. |
| F 20 | 392 | 1.9 | 40 | 0 | n.d. |
| G 10 | 392 | 5 | 130 | 0 | n.d. |
| H 15 | 401 | 5 | 80 | 0 | n.d. |
| I 20 | 392 | 4.1 | 380 | 1 | n.d. | n.d., not determined; n.a., not analyzed

Although the present invention has been described in detail, those skilled in the art should understand that they can make various changes, substitutions and alterations herein without departing from the spirit and scope of the invention in its broadest form.

What is claimed is:

1. A method of manufacturing a polymer comprising:
   passing a block copolymerization product through a first devolatilizer operated at a first low pressure to form a once devolatilized copolymer; and
   passing said once devolatilized block copolymer product from said first devolatilizer to a conduit.

2. The method as recited in claim 1 further including passing said once devolatilized block copolymer product from said conduit into a second devolatilizer to form a twice devolatilized block copolymer.

3. The method as recited in claim 2 wherein said first devolatilizer is operated at a lower processing temperature than said second devolatilizer.

4. The method as recited in claim 3 wherein said first devolatilizer is operated at a temperature of about 145° F. and said second devolatilizer is operated at a temperature of about 300° F.

5. The method as recited in claim 2 wherein said second devolatilizer is operated at a second low pressure wherein said second low pressure is less than said first low pressure.

6. The method as recited in claim 5 wherein said pressure of said first devolatilizer ranges from about 20 Torr to about 200 Torr and said pressure of said second devolatilizer is equal to or less than about 20 Torr.

7. The method as recited in claim 1 wherein said passing includes passing said block copolymerization product comprising:
   a monovinyl aromatic homopolymer block;
   a conjugated diene block;
   a random conjugated diene-monovinylic aromatic rubber block; and
   a monovinyl-substituted aromatic homopolymer block.

8. The method as recited in claim 1 wherein said passing said once devolatilized block copolymer includes passing to a pelletizer to form an end product.

9. The method as recited in claim 8 wherein passing said once devolatilized block includes passing through an extruder prior to passing said once devolatilized block copolymer product to said pelletizer.

10. The method as recited in claim 1 wherein said pressure of said first devolatilizer ranges from about 200 Torr to less than about 20 Torr.

11. The method as recited in claim 1 wherein said passing said once devolatilized block copolymer maximizes foam formation.

12. A method of manufacturing a block copolymer comprising:
   passing a block copolymerization product through a first devolatilizer operated at a first low temperature to form a once devolatilized block copolymer product;
   passing said once devolatilized block copolymer product from said first devolatilizer to a second devolatilizer operated at a second low temperature to form a twice devolatilized block copolymer product.

13. The method as recited in claim 12 wherein said first low temperature is less than said second low temperature.

14. The method as recited in claim 13 wherein said first low temperature is about 145° F. and said second low temperature is about 300° F.

15. The method as recited in claim 12 wherein a pressure of said first devolatilizer ranges from about 20 Torr to about 200 Torr and a pressure of said second devolatilizer is equal to or less than about 20 Torr.

16. The method as recited in claim 12 wherein said passing includes passing said block copolymerization product, comprising:
   a monovinyl aromatic homopolymer block;
   a conjugated diene block;
   a random conjugated diene-monovinylic aromatic rubber block; and
   a monovinyl-substituted aromatic homopolymer block.

17. The method as recited in claim 12 wherein said passing said once devolatilized block copolymer includes passing said twice devolatilized block copolymer product to a pelletizer to form an end product.

18. The method as recited in claim 17 wherein passing said once devolatilized block copolymer includes passing said twice devolatilized block copolymer product through an extruder prior to passing said twice devolatilized block copolymer product to said pelletizer.

19. The method as recited in claim 12 wherein said passing said block copolymer product through said first and second devolatilizers maximizes foam formation.

* * * * *